Nov. 19, 1957 J. B. GOSLING 2,813,957

SEMI-CONDUCTOR DEVICE

Filed Jan. 21, 1954

INVENTOR:—
JOSEPH B. GOSLING
BY:—
Junius F. Cook, Jr.
ATTORNEY

United States Patent Office 2,813,957
Patented Nov. 19, 1957

2,813,957

SEMI-CONDUCTOR DEVICE

Joseph B. Gosling, Milwaukee, Wis., assignor to General Electric Company, a corporation of New York Application January 21, 1954, Serial No. 405,486

11 Claims. (Cl. 201—63)

The present invention relates in general to semi-conductors and has more particular reference to the envelopement especially of relatively fragile semi-conductor elements, especially elements of crystalline character, whereby to obtain improved performance and durability of such elements in use.

Crystalline semi-conductor elements of the character mentioned are currently in widespread use as photo sensitive detectors and for other purposes in electrical translation systems. Hexagonal cadmium sulphide, for example, is a crystalline semi-conductor material of the sort having impedance characteristics which vary in accordance with the intensity of light radiation impinging on the material, including visible as well as invisible radiation. Germanium, silicon and numerous other materials have electrical semi-conductor properties.

Such photo conductive materials, especially crystalline cadmium sulphide are relatively fragile and tend to be sensitive to moisture. Accordingly, where used as elements in electrical translation systems, it is desirable, in the interests of reliability and uniform operation of equipment, to provide a means for enclosing the semi-conductive element in a suitable envelope that will not only exclude moisture but which also will afford mechanical protection for the enclosed element. Accordingly, an important object of the present invention is to provide a new and improved mounting for semi-conductive elements comprising a body of material in which the element is embeddingly enclosed; a further object being to envelop the semi-conductive element by applying material thereto in plastic condition under pressure and then allowing the enveloping material to solidify in position embedding the semi-conductive element.

Another important object is to provide for embedding the semi-conductive element in vitreous material, such as glass, while the same is in plastic condition.

Another important object is to embed a crystalline semi-conductive element in a body of enveloping material by pinch sealing the enveloping material while in plastic condition enclosing the element.

Another important object resides in embedding a crystalline semi-conductor element in glass by preforming a glass tube, electrically and mechanically connecting the element upon conductive support means, mounting the support means and element within the tube, heating the tube to soften the portions thereof opposite the element and finally pinch sealing the softened tube portions inwardly upon the semi-conductive element by applying pinch sealing pressure inwardly and on opposite sides of the tube.

Another important object is to provide a sealed unit comprising a crystalline semi-conductor element embedded within a body of enveloping material, including electrical conductor means connected with the embedded element and extending outwardly of the body of embedding material; a further object being to provide a semi-conductive element embedded in a body of glass.

Another important object is to provide an assembly unit comprising a tubular glass member formed with a pinch seal at one end and a crystal of semi-conductive material embedded in the glass material forming the pinch seal; a further object being to provide electrical conductor means electrically connected with the embedded element and extending thence through the tubular member and outwardly of the pinch seal remote end thereof.

Another important object is to provide a semi-conductive device comprising an elongated mounting member having a photo sensitive semi-conductive detector element mounted at one end of the mounting member including conductor means electrically connected with the detector element and extending thence outwardly of the end of the mounting member remote from said element, such device being adapted for longitudinal adjustment in a cooperative support in order to present the detector in precisely adjusted position as at the focus of a ray collecting reflector.

The foregoing and nmerous other important objects, advantages, and inherent functions of the invention will become apparent as the same is more fully understood from the following description, which, taken in connection with the accompanying drawings, discloses a preferred embodiment of the invention.

Referring to the drawings.

Figures 1, 2, 3, 4:
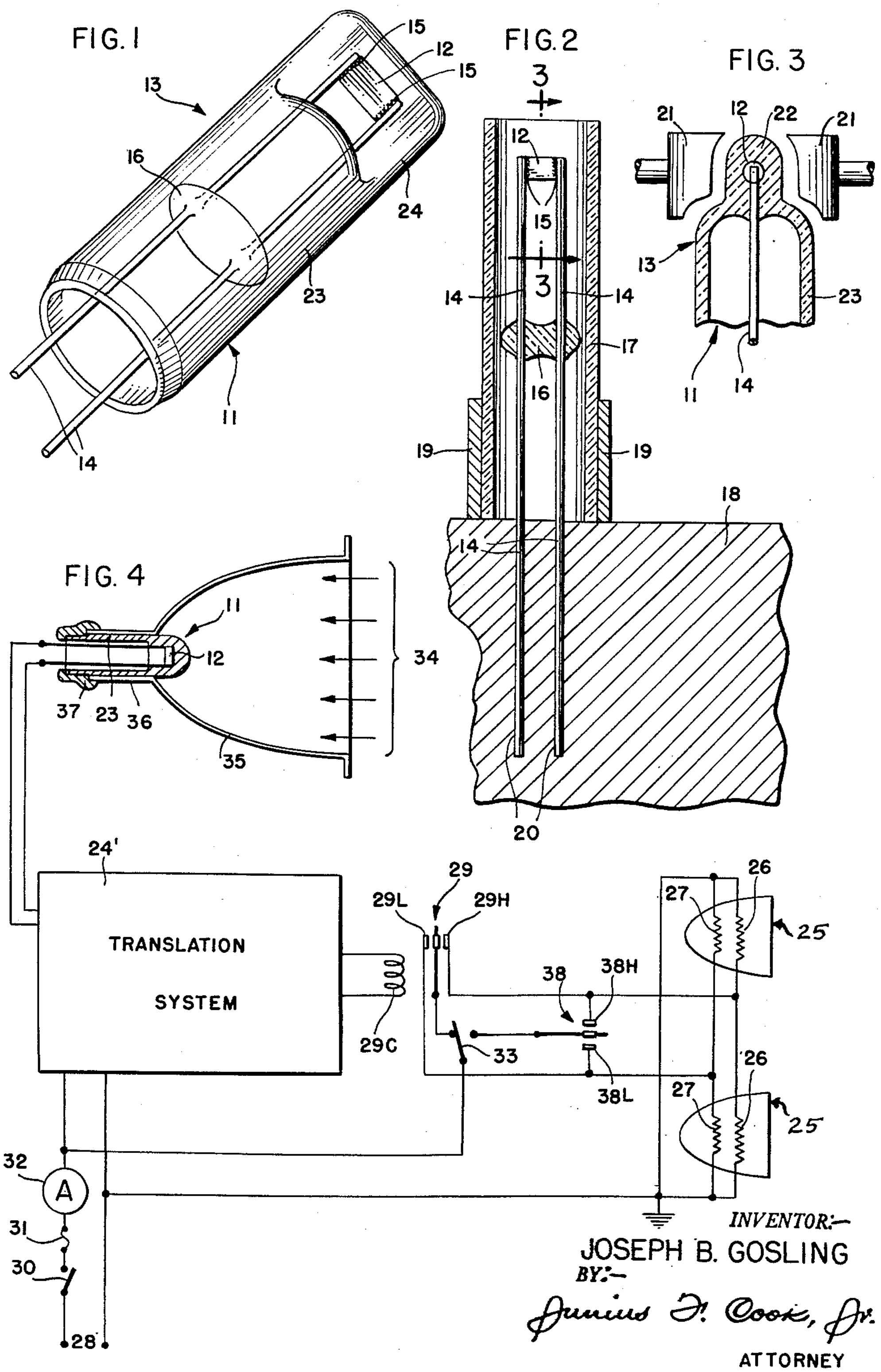
Fig. 1 is a perspective view of a semi-conductive device embodying the present invention.
Fig. 2 is a large scale sectional view, of somewhat diagrammatic character, illustrating a stage in the fabrication of the device shown in Fig. 1.
Fig. 3 is a sectional view taken substantially along the line 3—3 in Fig. 2, illustrating a successive stage in the fabrication of the device.
Fig. 4 is a diagrammatic representation of a translation system in which the device shown in Fig. 1 may be employed.

To illustrate the invention the drawings show a fabricated unit 11 comprising an electrical semi-conductor element 12 and an envelope 13 enclosing the semi-conductor element. The element 12 may comprise a block of any suitable or preferred semi-conductive material, including the hexagonal crystalline form of cadmium sulphide, cadmium selenide, mercury sulphide, germanium, silicon or other semi-conductor material.

The element 12 may be electrically and mechanically connected to the ends of lead conductors 14 in any suitable or preferred fashion, as by means of electrically conducting cement 15 such as Aquadag or Alkadag, respectively comprising colloidal suspensions of graphite in water and in alcohol. Inasmuch as the element 12 is of relatively fragile character, especially where the same comprises crystalline cadmium sulphide, it is desirable to mechanically interconnect the lead conductors 14 firmly in spaced apart relationship, as by means of a spacing member 16 of insulating material disposed on the conductors 14 adjacent the element 12, whereby to substantially eliminate mechanical strain upon the mounted crystal and the crystal connecting means 15. To this end the spacing member 16 preferably comprises a bead of glass in which both of the lead conductors 14 are firmly embedded. While the envelope 13 may comprise any suitable or preferred material capable of embeddingly receiving the element 12, such material, where the element is expected to respond in accordance with its photo sensitive characteristics, should be at least pervious and preferably substantially transparent to light radiation to which the element 12 is responsive. Accordingly, the envelope 13 preferably comprises glass, although it will be apparent that the invention is not necessarily limited to glass as an enveloping material but may include various plastic substances in which the element 12 may be enclosingly embedded.

In order to embed the element 12 in the envelope 13, a tubular member 17 comprising the envelope material may be formed to desired length. The element 12 and connected lead conductors 14 may then be assembled within the tubular member 17 with the element 12 disposed preferably within an end of the tubular member, the spacing member 16 serving to hold the conductor supported element 12 in more or less centered position within the end of the member 17. The member 17 may then be treated to render the portions thereof which surround the element 12 sufficiently plastic to allow said portions to be pressed inwardly upon and thus secured sealingly about the element 12 and the element connected ends of the conductors 14, to thereby embed the element within the inwardly pressed portions of the sleeve member.

Where the sleeve member 17 comprises glass, as is preferably the case, the member may be mounted in pinch seal forming mechanism of the sort commonly employed for making pinch seals in incandescent lamps and the like. Such mechanism may comprise a turnable frame 18 on which the member 17 may be demountably supported, as by means of spring clips 19, in position to be rotated about its axis. The turnable frame 18 may also be formed with cavities or other suitable mounting means for receiving the lead conductors in order to support the same and the element 12 carried thereby in assembled position within the tubular member 17 when the same is mounted on the frame 18.

The pinch seal forming equipment may also include heating means such as gas burners positioned to apply glass softening heat to the portions of the glass member 17 which immediately surround the element 12. The seal forming equipment may also include normally retracted pressing members 21 movable inwardly upon the member 17. As a consequence, after the material of the member 17, opposite the element 12, has attained a desired soft pressable condition, application of heat to the member 17 may be discontinued and the presser members 21 thereafter operated to form the softened portions of the member 17 mutually inwardly upon the element 12 to thereby form a press seal 22 comprising the softened material of the member 17 about the element 12, the element being thereby hermetically enclosed and embedded within the inwardly pressed envelope forming material.

After pressing, the soft glass is allowed to resolidify and may then be annealed by allowing the same to cool off slowly in order to eliminate the development of strains in the glass. The foregoing procedure results in the complete glass envelopment not only of the element 12, but also the relatively flimsy electrical connections 15 are enclosed under pressure in a glass sheath, thereby preserving the element against fracture and the electrical connections against deterioration resulting from drying, powdering or flaking. The embedding of the parts in a glass sheath not only protects the element 12 against mechanical damage but also assures the exclusion of moisture from the element and hence inhibits alteration of the response characteristics of the element as the result of moisture.

After the pressed material shall have cooled, following the pressing operation, the embedded element 12 and the attached ends of the conductors 14 will be hermetically sealed and enclosed within a solid body of the enveloping material. The embedded element 12 thus will not only be protected against moisture and other deleterious substances, but the relatively fragile element as well as its relatively fragile connections 15 with the lead conductors will be guarded against mechanical damage by the relatively strong sheath afforded by the enveloping material in which the element and the connected ends of the conductors 14 are embedded.

It will be seen that the unit 11, as shown in Fig. 1, comprises an elongated, preferably cylindrical body 23 comprising the unpressed portions of the member 17, the inwardly pressed portions of the member 17 forming a solid block of material 24 at one end of the body 23, in which block 24 the element 12 is embedded, the lead conductors 14 extending from the block 24 through the body 23 and emerging therefrom at the end thereof remote from the block 24. The invention, of course, is not necessarily limited to the unit 11 including the body portion 23; but said body, if desired, may be removed from the head 24 and discarded. The body 23, integrally connected with the embedding block 24, however, may be retained as a part of the unit 11 since it affords useful means for mounting the crystal in a desired position. By means of the elongated body 23 the unit may be mounted in a rubber grommet or clamp, or in any suitable holder. Where the body 23 is of cylindrical configuration, it affords means for longitudinal or axial as well as rotational adjustment of the unit in a suitable holder formed to receive the body 23.

Employment of the unit 11 as a light sensitive detector element for controlling the operation of vehicle headlamps is illustrated diagrammatically in Fig. 4 of the drawings. As shown, the unit 11 together with an associated translation system 24′ may be mounted on and carried by a vehicle having headlights 25 to be controlled in response to the head-on approach of another headlighted vehicle. The headlights 25, of course, are mounted in the vehicle in position to project beams of light forwardly of the vehicle. Each of the lamps 25 may embody a high or bright beam filament 26 and a low or dim beam filament 27, one end of each of said filaments being electrically connected to the preferably grounded side of a suitable source of electrical power 28. The ground remote ends of the high beam filaments may be electrically interconnected with a contact 29H of a single pole double throw dimmer switch 29. The ground remote ends of the low beam filaments may also be interconnected with another contact 29L of said dimmer switch, the pole of the dimmer switch being electrically connected with the ground remote side of the power source 28, as through suitable circuit forming devices which may include a disconnecting switch 30, a fuse 31, a meter 32 and a selector switch 33.

The power source 28 may conveniently comprise a conventional storage battery of the sort commonly provided as standard equipment in automative vehicles for the operation of headlights and other electrical equipment. When the pole of the switch 29 is electrically connected with the ungrounded side of the power source 28, it will be seen that the bright and dim beam filaments 26 and 27 may be alternately energized by operation of the dimmer switch 29 as by selectively energizing the operating coil 29C thereof. To this end the switch 29 may be biased to normally close its blade with the contact element 29H, the blade being movable in response to excitation of the coil 29C to disengage the contact 29H and to engage with the contact 29L.

In order to provide for the automatic control of the lamps 25 in response to the head-on approach of another headlighted vehicle, the unit 11 may be mounted on the vehicle carrying the lamps 25 in position exposed to the action of light rays 34 emitted by the headlamps of the approaching vehicle, the light sensitive element 12 of the unit 11 being electrically connected to control the translation system 24′ in order to energize the relay coil 29C, when the intensity of the rays 34 attain a selected lamp dimming level.

To these ends the unit 11 may be mounted in position presenting the element 12 at the focus of a light collecting reflector 35, which may conveniently comprise a parabolic shell formed with internal light reflecting mirror surfaces adapted to deliver, at the focus of the reflector, all light rays entering the open end of the shell. The shell 35, of course, may be mounted upon the vehicle which carries the lamps 25 in position with the open end of the shell facing toward the source of origin of the actuating light rays 34. The shell 35, at its apexial portion opposite the open end thereof, may be fitted with a mounting sleeve 36 sized to snugly yet slidingly receive the body portion 23 of the unit 11. The unit accordingly may be axially adjusted in the sleeve 36 into position presenting the detector element 12 precisely at the focus of the light collecting reflector 35; and the unit may be secured in adjusted position in any suitable manner as by taping the same in place or by means of a suitable preferably quick drying putty or cement, such as malachite basic cement 37.

The translation system 24' may comprise any preferred means for energizing the relay coil 29C under the control of the light sensitive element 12, a suitable translation system being illustrated and described in the copending application for United States Letters Patent Serial No. 385,563 filed October 12, 1953, on the invention of John E. Jacobs for Light Responsive System.

It will be noted that the system shown in Fig. 4 includes a manually operable single pole double throw switch 38 having contact elements 38H and 38L respectively interconnected with the ground remote sides of the high and low beam lamp filaments 26 and 27, the pole of said manually operable dimming switch 38 being electrically connected with the selector switch 33 so that said switch may be operated to connect either the pole of the switch 29 or the pole of the switch 38 with the ground remote side of the power source 28. The selector switch 33 accordingly will determine whether the lamps 25 are controlled by the operator of the vehicle through the switch 38 or by the light sensitive detector unit 11 through the relay switch 29 and the translation system 24'.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A cell comprising a body of fragile crystalline material having photoelectric semi-conductive properties, conductor means in electrical contact with and extending outwardly of said body, and vitreous material enclosing and embedding said body and the electrical connection thereof with said conductor means, whereby to hold the body and said conductor means together in electrical contact and to protect the fragile body against mechanical damage.

2. A cell comprising a body of relatively fragile crystalline material having photoelectrical semi-conductive properties, conductor means in electrical contact with said crystal, and glass enclosing and embedding said body and the electrical connection thereof with said conductor means, whereby to hold the body and said conductor means together in electrical contact and to protect the fragile body against mechanical damage.

3. A cell comprising a body of fragile crystalline material having visible light sensitive semi-conductive properties, a pair of electrical conductors disposed in electrical contact with spaced apart portions of said body, a bead of insulating material secured to said conductors at a mounting station spaced from said body to support said conductors in relatively insulated spaced apart relationship outwardly of said body, and visible light transparent material enclosing and embedding said body and the electrical connections thereof with said conductors, whereby to hold the body and said conductor means together in electrical contact and to protect the fragile body against mechanical damage.

4. A cell comprising a body of fragile crystalline material having photoelectric semi-conductive properties, conductor means in electrical contact with and extending outwardly of said body, and glass formed as a pinch seal in position enclosing and embedding said body and the electrical connection thereof with said conductor means, whereby to hold the body and said conductor means together in electrical contact and to protect the fragile body against mechanical damage.

5. A cell comprising a body of electrical semi-conductor material, conductor means electrically connected with and extending outwardly of said body, and a tubular sleeve of vitreous material enclosing said conductor means and said body, said sleeve including an integral portion formed as a pinch seal embedding said body and the electrical connection thereof with said conductor means, said conductor means extending outwardly of said pinch seal through the seal adjacent tubular portions of said sleeve.

6. A cell comprising a body of relatively fragile crystalline semi-conductor material, conductors electrically connected with and extending outwardly of said body, and a tubular sleeve of glass enclosing said body and connected conductors, said sleeve being formed at one end with an integral portion providing a lump of glass compressed upon said body, whereby the same and the body connected conductors are integrally embedded in said lump, with said conductors extending outwardly of the lump and through said tubular sleeve.

7. A cell comprising a body of relatively fragile crystalline cadmium sulphide having photoelectric semi-conductive properties, conductor means in electrical contact with and extending outwardly of said body, and vitreous material enclosing and embedding said body and the electrical connections thereof with said conductor means, whereby to hold the body and said conductor means together in electrical contact to protect the fragile body against mechanical damage.

8. A cell comprising a body of relatively fragile crystalline cadmium selenide having photoelectric semi-conductive properties, conductor means in electrical contact with and extending outwardly of said body, and vitreous material enclosing and embedding said body and the electrical connections thereof with said conductor means, whereby to hold the body and said conductor means together in electrical contact to protect the fragile body against mechanical damage.

9. A cell comprising a body of relatively fragile crystalline mercury sulphide having photoelectric semi-conductive properties, conductor means in electrical contact with and extending outwardly of said body, and vitreous material enclosing and embedding said body and the electrical connections thereof with said conductor means, whereby to hold the body and said conductor means together in electrical contact to protect the fragile body against mechanical damage.

10. A cell comprising a body of fragile crystalline material having visible light sensitive semi-conductive properties and selected from the class consisting of the sulphides and selenides of cadmium and mercury, a pair of electrical conductors disposed in electrical contact with spaced portions of said body, and a lump of visible light transparent glass compressed upon said body in position enclosing and embedding the same and the electrical connections thereof with said conductors, whereby to hold said fragile body and said conductor means together in electrical contact and to protect the body against mechanical damage.

11. A cell comprising a body of fragile crystalline material having visible light sensitive semi-conductive properties and selected from the class consisting of the sulphides and selenides of cadmium and mercury, a pair of electrical conductors disposed in electrical contact with spaced portions of said body, a bead of insulating material secured to said conductors outwardly of said body to support the conductors in relatively insulated spaced apart relationship, and a lump of visible light transparent glass compressed upon said body in position enclosing and embedding the same and the electrical connections thereof with said conductors, whereby to hold said fragile body and said conductor means together in electrical contact and to protect the body against mechanical damage.

References Cited in the file of this patent

UNITED STATES PATENTS

| | | |
|---|---|---|
| 845,413 | Haagn | Feb. 26, 1907 |
| 2,396,196 | Pearson | Mar. 5, 1946 |
| 2,493,919 | Holmes | Jan. 10, 1950 |
| 2,668,867 | Ekstein | Feb. 9, 1954 |